United States Patent [19]

Schuster et al.

[11] 4,049,745

[45] Sept. 20, 1977

[54] HIGHLY REACTIVE SULPHUR-CONTAINING COATING AGENTS HARDENING UNDER UV-LIGHT

[75] Inventors: Karl Ernst Schuster, Kerken; Hans Jurgen Rosenkranz, Krefeld; Hans Rudolph, Krefeld-Bockum, all of Germany

[73] Assignee: Bayer Aktiengesellschaft, Germany

[21] Appl. No.: 707,871

[22] Filed: July 22, 1976

[30] Foreign Application Priority Data

July 24, 1975 Germany ............................. 2533125

[51] Int. Cl.$^2$ ............................................. C08L 63/00
[52] U.S. Cl. ........................... 260/837 R; 204/159.22; 204/159.23; 260/830 S; 260/836; 427/44; 427/54
[58] Field of Search ................. 260/836, 837 R, 830 S

[56] References Cited

U.S. PATENT DOCUMENTS

| 2,826,562 | 3/1958 | Shokal | 260/837 R |
|---|---|---|---|
| 3,301,743 | 1/1967 | Fekete | 260/837 R |
| 3,377,406 | 4/1968 | Newey | 260/837 R |
| 3,662,022 | 5/1972 | Lard | 260/837 R |
| 3,676,283 | 7/1972 | Kehr | 260/837 R |
| 3,835,085 | 9/1974 | Wrezesinski | 260/837 R |
| 3,914,288 | 10/1975 | Garnish | 260/830 S |

*Primary Examiner*—Paul Lieberman
*Attorney, Agent, or Firm*—Connolly and Hutz

[57] ABSTRACT

An air-drying coating composition comprising a reaction product of a polyepoxide with more than one 1,2-epoxide group per molecule, at least 60% of whose epoxide groups have been reacted a. with 0.01 to 0.6 SH-equivalents, based on one epoxide equivalent of hydrogen sulphide, an aliphatic or cycloaliphatic, aromatic or araliphatic dithiol or polythiol or with a mixture thereof, and subsequently b. with 0.99 to 0.4 carboxyl equivalents, based on one epoxide equivalent, of acrylic or methacrylic acid or of a mixture thereof.

2 Claims, No Drawings

HIGHLY REACTIVE SULPHUR-CONTAINING COATING AGENTS HARDENING UNDER UV-LIGHT

This invention relates to new sulphur-containing unsaturated resins of polyepoxides, hydrogen sulphide, aliphatic, cycloaliphatic, aromatic or araliphatic dithiols or polythiols and (meth)acrylic acid for use as highly reactive coating compositions preferably hardening by radiation.

The reaction of glycidyl ethers of bisphenol A with acrylic acid leads to resin-like products which, by virtue of their content of vinyl groups, are capable of crosslinking by radical polymerisation. Systems such as these are described, for example, in British Patent Specification No. 1,006,587 and in U.S. Pat. No. 3,317,465. Solutions of these reaction products in vinyl monomers, such as acrylic or methacrylic acid esters, or even styrene are used as cast resins which are distinguished in particular by their high resistance to hydrolysis.

Like solutions of unsaturated polyester resins in styrene, these products are hardened by the addition of organic peroxides and, optionally, accelerators, for example, cobalt salts. It is also known that reaction products of epoxy resins and acrylic acid, dissolved in acrylic acid esters, can be provided with a photoinitiator and hardened by the action of UV-light. Products of this type are used as special dental filling compositions, as described in German Offenlegungsschrift No. 2,126,419.

However, attempts to use systems of this type as UV-light-hardening coating compositions in thin layers have shown that their crosslinking velocity is too low for practical application, especially in the presence of air. In general, thin layers of these compositions retain a very tacky surface.

It is known from DT-OS No. 2,349,979 that UV-light-hardening compositions, which harden quickly with a tack-free surface, even when in thin layers, under the irradiation sources normally used in practice, can be obtained from reaction products of polyepoxides with (meth)acrylic acid, photoinitiators and special polyfunctional monomers.

It is also known from DT-OS No. 2,221,355 that monomer-free unsaturated polyesters can be hardened by UV-light in the presence of photoinitiators in thin layers with a thickness of up to 50μ. The hardening times are between about 2 and 15 seconds, depending upon the type of photoinitiator used.

It is also known that tertiary amines considerably improve the reactivity of a photo polymerisable system. However, mixtures of this type have the disadvantage that they can only be stored for a relatively short period, in addition to which the free tertiary amine is troublesome in numerous applications, for example in cases where mixtures of this kind are used in offset printing inks.

Nevertheless, to be able to obtain a reactivity comparable with that obtainable with additions of amine, but without any of the aforementioned disadvantages, would still be highly desirable in practice.

It has now surprisingly been found that it is possible by reacting polyepoxides with hydrogen sulphide, an aliphatic, cycloaliphatic, aromatic or araliphatic dithiol or polythiol, and subsequently with (meth)acrylic acid, to obtain UV-light-hardening compositions which harden with a non-tacky, solvent-resistant surface, even in thin layers, in hitherto unattainable short times under the irradiation sources conventionally used.

Since, in addition, the system may be mixed with polymersiable monomers without undergoing any significant changes in regard to its reactivity, storability and air-drying properties, the invention thus provides a universally applicable, highly reactive air-drying coating composition which does not have any of the disadvantages of conventional photopolymerising coating compositions based on acrylic esters.

Another surprising feature is that the coating compositions according to the invention, hardened in the usual way with peroxide + accelerator, also harden with a non-tacky surface, in other words the inhibiting effect of air is limited in this respect, too.

Accordingly, the present invention provides a process for the production of highly reactive coating compositions based on reaction products of polyepoxides and $\alpha,\beta$-mono-olefinically unsaturated carboxylic acids which is characterised by the fact that at least 60% of the epoxide groups of a polyepoxide with more than one 1,2-epoxide group per molecule are reacted
 a. with 0.01 to 0.6 HS-equivalents, based on 1 epoxide equivalent, of hydrogen sulphide, an aliphatic or cycloaliphatic, aromatic or araliphatic dithiol or polythiol or a mixture of the aforementioned sulphur compounds, and subsequently
 b. with 0.99 to 0.4 carboxyl equivalents, based on 1 epoxide equivalent, of acrylic and/or methacrylic acid or a mixture of acrylic and methacrylic acid.

The invention also relates to the products obtained by the process, i.e., air-drying highly reactive coating compositions containing reaction products of a polyepoxide with more than one 1,2-epoxide group per molecule, at least 60% of which epoxide groups have been reacted
 a. with 0.01 to 0.6 HS-equivalents, based on 1 epoxide equivalent, of hydrogen sulphide, an aliphatic or cycloaliphatic, aromatic or araliphatic dithiol or polythiol or a mixture of the aforementioned sulphur compounds, and subsequently
 b. with 0.99 to 0.4 carboxyl equivalents, based on 1 epoxide equivalent, of acrylic or methacrylic acid or of a mixture of acrylic and methacrylic acid.

In the context of the invention, polyepoxides are compounds which contain more than one 1,2-peroxide group (=2,3 epoxypropyl group) per molecule, preferably 1.6 to 6 and more especially 1.6 to 3 epoxide groups. Furthermore, one epoxide equivalent represents the quantity of an epoxide-group-containing compound in grams which contains one epoxide group.

The polyepoxide compounds used may be polyglycidyl ethers of polyhydric phenols, for example of pyrocatechol, resorcinol, hydroquinone, of 4,4'-dihydroxy diphenyl methane, of 4,4'-dihydroxy-3,3'-dimethyl diphenyl methane, of 4,4'-dihydroxy diphenyl dimethyl methane (bisphenol A), of 4,4'-dihydroxy diphenyl methyl methane, of 4,4'-dihydroxy diphenyl cyclohexane, of 4,4'-dihydroxy-3,3'-dimethyl diphenyl propane, of 4,4'-dihydroxy diphenyl, of 4,4'-dihydroxy diphenyl sulphone, of tris-(4-hydroxphenyl)-methane, of the chlorination and bromination products of the aforementioned diphenols, more especially of bisphenol A; of novolaks (i.e., of reaction products of monohydric or polyhydric phenols with aldehydes, more especially formaldehyde, in the presence of acid catalysts), of diphenols which have been obtained by esterifying 2 mols of the sodium salt of an aromatic hydroxy carboxylic acid with 1 mol of a dihalogen alkane or dihalogen dialkyl ether (cf. British Patent Specification No. 1,017,612), of polyphenols which have been obtained by the condensation of phenols and long-chain halogen paraffins containing at least 2 halogen atoms (cf. British Patent Specification No. 1,024,288).

The polyepoxide compounds used may also be glycidyl ethers of polyhydric alcohols, for example of 1,4-butane diol, 1,4-butene diol, glycerol, trimethylol propane, pentaerythritol and polyethylene glycols. Triglycidyl isocyanurate and N,N'-diepoxy propyl oxamide are also of interest.

It is also possible to use glycidyl esters of polybasic aromatic, aliphatic and cycloaliphatic carboxylic acids, for example phthalic acid diglycidyl ester, siophthalic acid diglycidyl ester, terephthalic acid diglycidyl ester, tetrahydrophthalic acid diglycidyl ester, adipic acid diglycidyl ester, hexahydrophthalic acid diglycidyl ester which may optionally be substituted by methyl groups, and glycidyl esters of reaction products of 1 mol of an aromatic or cycloaliphatic dicarboxylic acid anhydride and 1/2 mol of a diol or 1/n mol of a polyol with n hydroxyl groups, for example glycidyl carboxylic acid esters corresponding to the general formula

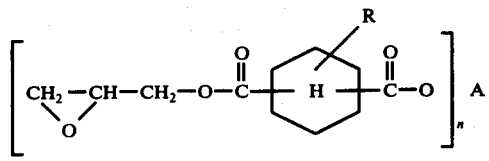

in which A represents an at least difunctional radical of an aliphatic hydrocarbon optionally interrupted by oxygen and/or cycloaliphatic rings, or the difunctional radical of a cycloaliphatic hydrocarbon, R represents hydrogen or alkyl radicals with 1 to 3 carbon atoms and n is a number from 2 to 6, or mixtures of glycidyl carboxylic acid esters corresponding to the above general formula (cf. British Patent Specification No. 1,220,702.)

The following polyepoxide compounds or mixtures thereof are preferably used for the process according to the invention: polyglycidyl ethers of polyhydric phenols, more especially of bisphenol A; phthalic acid diglycidyl ester, isophthalic acid diglycidyl ester, terephthalic acid diglycidyl ester, polyglycidyl esters of cycloaliphatic dicarboxylic acids, more especially hexahydrophthalic acid diglycidyl ester and polyepoxides of the reaction product of n mols of hexahydrophthalic acid anhydride and/or phthalic acid anhydride and 1 mol of a polyol with n hydroxyl groups (n = integer from 2 to 6), more especially of 3 mols of hexahydrophthalic acid anhydride and/or phthalic acid anhydride and one mol of 1,1,1-trimethylol propane.

Bisphenol polyglycidyl ethers are particularly preferred.

One or more sulphur compounds corresponding to the formula

HS - R - SH are used for the process according to the invention. In this formula, (-R-SH) represents hydrogen or R = $C_1$-$C_{18}$ alkylene, preferably $C_1$-$C_6$ alkylene, alkylene-bis(-carbonyloxy alkylene) with 1 to 6 carbon atoms in the alkylene radical and 2 to 6 carbon atoms in the oxyalkylene radical [e.g.-$(CH_2)_2$-

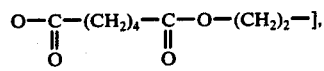

the residual of a polyalkylene glycol ether or polyalkylene glycol polyether reduced by both the terminal hydroxyl groups with 2 to 6 carbon atoms in the identical or different alkylene groups, an aromatic radical, an aliphatic-aromatic radical or a cycloaliphatic radical.

Particularly preferred compounds are hydrogen sulphide, hexane-1,6-dithiol, adipic acid-bis-(2-mercapto)-diethyl ester, bis-mercaptomethyl benzene. From 0.01 to 0.6 and preferably from 0.05 to 0.4 HS-equivalents of hydrogen sulphide or of the dithiols mentioned are used to one epoxide equivalent. In the context of the invention, one SH-equivalent is the quantity of hydrogen sulphide or thiol in grams which contains one gram atom of hydrogen attached to S.

Reaction of the sulphur compounds with the polyepoxides may be carried out in various ways, for example either in the presence or absence of an inert solvent, such as methanol, ethanol, propanol, isopropanol, butanol, isobutanol, secbutanol, tert-butanol, cyclohexanol, 2-ethyl-1-hexanol, benzene, xylene, toluene, hexane, heptane, octane, isooctane, cyclopentane, cyclohexane, cycloheptane, cyclopentanone, cyclohexanone, methyl acetate, ethyl acetate, propyl acetate, n-butyl acetate, chloroform, carbon tetrachloride, trichloroethane, dichloroethane, tetrachloroethane and chlorobenzene. The reaction may readily be carried out at temperatures of from 20° to 90° C and preferably at temperatures of from 40° to 90° C. In exceptional cases, these temperatures may even be exceeded at either end of the range.

The reaction products of the polyepoxides with hydrogen sulphide and/or the dithiols mentioned represent β-hydroxy propyl thioethers, are soluble in organic solvents and are not crosslinked. In every case, they contain free epoxide groups.

Even at this stage, the resins obtained have a strictly neutral odour given complete conversion. There is no trace whatever of a characteristic odour such as would otherwise be attributed to sulphur-containing compounds.

After the polyepoxides have been reacted with the sulphur compounds, they are reacted with acrylic and/or methacrylic acid. From 0.4 to 0.99 and preferably from 0.7 to 0.95 carboxyl equivalents of(meth)acrylic acid are used per epoxide equivalent.

In the context of the invention, one carboxyl equivalent is the quantity of carboxylic acid in grams containing one gram mol of carboxyl groups.

Addition of the acrylic and/or methacrylic acid with the polyepoxides reacted with hydrogen sulphide and/or with the dithiols is carried out by known methods, for example by the process according to U.S. Pat. Nos. 3,301,743 or No. 2,824,851 either in the presence or absence of solvents of the type mentioned in reference to the reaction of the polyepoxides with the sulphur compounds. If desired, addition of the (meth) acrylic acid may be carried out in the presence of about 0.01 to 3% by weight, based on the starting epoxide, of such catalysts as tertiary amines, alkali hydroxides, alkali salts of organic carboxylic acids, bis-(hydroxyalkyl)-sulphides, sulphonium compounds, phosphonium compounds, phosphines, arsines or stibines. Reaction temperatures of from 40° to 90° C have proved to be appropriate, although in special cases these temperatures may be exceeded at either end of the range.

In the end products, at least 60% of the epoxide groups present in the starting polyepoxide, preferably from 65 to 95, should have reacted with the above-mentioned sulphur compounds and (meth)acrylic acid. However, all the epoxide groups may also be reacted.

In order to protect the polymerisable reaction products according to the invention against undesirable premature polymerisation, it is advisable to add during their preparation from 0.001 to 0.1% by weight, based on the mixture as a whole, of polymerisation inhibitors or antioxidants.

Suitable additives of this kind are, for example, phenols and phenol derivatives, preferably sterically hindered phenols which contain alkyl substituents with 1 to 6 carbon atoms in both 0-positions to the phenolic hydroxy group, amines, preferably secondary acrylamines and their derivatives, quinones, copper-I-salts of organic acids and addition compounds of copper(I)halides with phosphites.

The following compounds are mentioned by name: 4,4'-bis-(2,6-di-tert-butyl phenol), 1,3,5-trimethyl-2,4,6-tris-(3,5-di-tert-butyl-4-hydroxy benzyl)-benzene, 4,4'-butylindene-bis-(6-tert-butyl-m-cresol), 3,5-di-tert-butyl-4-hydroxybenzyl phosphonic acid diethyl ester, N,N'-bis-($\beta$-naphthyl)-p-phenylene diamine, N,N'-bis-(1-methylheptyl)-p-penylene diamine, phenyl-$\beta$-naphthyl amine, 4,4'-bis-($\alpha,\alpha$-dimethylbenzyl)-diphenyl amine, 1,3,5-tris-(3,5-di-tert-butyl-4-hydroxyhydrocinnamoyl)-hexahydro s-triazine, hydroquinone, p-benzoquinone, 2,5-di-tert-butyl quinone, toluhydroquinone, p-tert-butyl pyrocatechol, 3-methyl pyrocatechol, 4-ethyl pyrocatechol, chloranil, naphthoquinone, copper naphthenate, copper octoate, Cu(I)Cl/triphenyl phosphite, Cu(I)Cl/trimethyl phosphite, Cu(I)Cl /trischloroethyl phosphite, Cu(I)Cl /tripropyl phosphite, p-nitrosodimethyl aniline.

Other suitable stabilisers are described in "Methoden de organischen Chemie" (Houben-Weyl), 4th edition, vol 14/1, pages 433–452, 756, Georg Thieme Verlag, Stuttgart, 1961. Particularly suitable stabilisers are, for example, p-benzo quinone and/or hydroquinone monomethyl ether used in a concentration of from 0.001 to 0.05% by weight, based on the mixture as a whole.

The reaction products according to the invention may in some cases be used without the addition of copolymerisable monomers or solvents. However, since the reaction products according to the invention are often highly viscous products, it is advisable to mix them with copolymerisable monomers in order to obtain processible viscosities and/or to vary the properties of the hardening products.

Suitable monomers are:

1. esters of acrylic acid or methacrylic acid with aliphatic $C_1$ - $C_8$, cycloaliphatic $C_5$ - $C_6$, araliphatic $C_7$ - $C_8$ monoalcohols, for example methyl acrylate, ethyl acrylate, n-propyl acrylate, n-butyl acrylate, methyl hexyl acrylate, 2-ethyl acrylate and the corresponding methacrylic acid esters; cyclopentyl acrylate, cyclohexyl acrylate or the corresponding methacrylic acid esters; benzyl acrylate, $\beta$-phenyl ethyl acrylate and corresponding methacrylic acid esters;
2. hydroxy alkyl esters of acrylic or methacrylic acid with 2 to 4 carbon atoms in the alcohol moiety wuch as hydroxy ethyl acrylate, 2-hydroxy propyl acrylate, 3-hydroxy propyl acrylate, 2-hydroxy butyl acrylate, 4-hydroxy butyl acrylate or corresponding methacrylic acid esters;
3. di- and poly-acrylates and also di- and poly-methacrylates of glycols with 2 to 6 carbon atoms and polyols with 3 to 4 hydroxyl groups and 3 to 6 carbon atoms, such as ethylene glycol diacrylate, propane-1,3-diol diacrylate, butane-1,4-diol diacrylate, hexane-1,6-diol diacrylate, trimethylol propane triacrylate, pentaerythritol tri- and tetra-acrylate and corresponding methacrylates, also di(meth)acrylates of polyether glycols of glycol, propane-1,3-diol, butane-1,4-diol;
4. aromatic vinyl and divinyl compounds, such as styrene, methyl styrene and divinyl benzene;
5. N-methylol acryamide or N-methylol methacryl amide and corresponding N-methylol alkyl ethers with 1 to 4 carbon atoms in the alkyl ether group, and corresponding N-methylol allyl ethers, more especially N-methoxy methyl(meth)acrylamide, N-butoxy methyl(meth)acryl amide and N-allyl oxymethyl(meth)acryl amide;
6. vinyl alkyl ethers with 1 to 4 carbon atoms in the alkyl group, such as vinyl methyl ether, vinyl ethyl ehter, vinyl propyl ether and vinyl butyl ether;
7. trimethylol propane diallyl ether mono(meth)acrylate, vinyl pyridine, N-vinyl carbazole, triallyl phosphate, triallyl isocyanurate and others.

It is also possible to use mixtures of one or more of the above-mentioned polymers. The additions amount to between about 5 and 50% by weight and preferably to between 20 and 40% by weight, based on the mixture of reaction products according to the invention and additional monomers.

Similarly, it is possible to adjust a suitable viscosity by admixture with inert solvents such as butyl acetate, ethyl acetate, acetone, ethyl methyl ketone, diethyl ketone, cyclohexane, cyclohexanone, cyclopentane, cyclopentanone, n-heptane, n-hexane, n-octane, isooctane, methylene chloride, chloroform, 1,1-dichloroethane, 1,2-dichloroethane, 1,1,2-trichloroethane and carbon tetrachloride. In order to obtain a processible viscosity, it is possible to add from 5 to 50% by weight and preferably from 20 to 40% by weight of solvents, based on the mixture of reaction products according to the invention together with the solvent.

It is of course also possible to use mixtures of additional monomers and solvents within the quantitative ratios indicated.

Hardening (air drying) of the reaction products according to the invention, optionally in admixture with other copolymerisable monomers, may be obtained by means of high-energy radiation, such as UV-light, electron beams, gamma rays, or in the presence of radical donors, such as thermal polymerisation initiators.

The reaction products according to the invention are preferably used as coating compositions which can be hardened by UV-light, their particular advantage in this respect being that they harden in very short times, even in the presence of air. Photoinitiators have to be added for this particular application.

Compounds normally used as photoinitiators are suitable for example benzophenone, and also quite generally aromatic keto compounds of the type derived from benzophenone, such as alkyl benzo phenones, halogenmethylated benzophenones according to German Offenlegungsschrift No. 1,949,010, Michler's ketone, anthrone, halogenated benzophenones. Other suitable photoinitiators are benzoin and its derivatives, for example according to German Offenlegungsschrift Nos. 1,769,168; 1,769,853; 1,769,854; 1,807,297; 1,807,301; 1,919,678 and German Auslegeschrift No. 1,694,149. Other effective photoinitiators are anthraquinone and many of its derivatives, for example β-methyl anthraquinone, tert-butyl anthraquinone and anthraquinone carboxylic acid esters, also oxime esters according to German Offenlegungsschrift No. 1,795,089.

In cases where the reaction products according to the invention are hardened without the addition of other monomers, the oxime esters according to German Offenlegungsschrift No. 1,795,089 and the benzophenone derivatives according to German Offenlegungsschrift No. 1,949,010 are preferably used as photoinitiators.

Particularly preferred photoinitiators for hardening the reaction products according to the invention, optionally in the presence of other monomers, are benzoin derivatives corresponding to the general formula

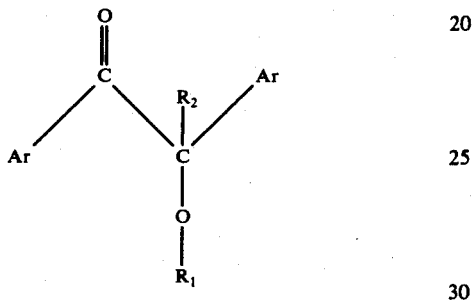

in which Ar represents an aromatic radical which may be unsubstituted or substituted by one or more of alkyl alkoxy, halogen-substituted aromatic radical;

$R_1$ = linear or branched chain alkyl radical with ($C_1$-$C_{12}$), cycloalkyl, such as cyclohexyl, tetrahydropyranyl, 1-methoxy ethyl;
$R_2$ = allyl, benzyl, optionally substituted by halogen, or the radical -$CH_2$-$CH_2$-X where X = CN, $CONH_2$, $COOR_3$ and
$R_3$ = H, lower alkyl ($C_1$-$C_{10}$).

Preferably, Ar = phenyl, $R_1$ is a linear or branched chain alkyl radical with 1 to 4 carbon atoms and $R_2$ is alkyl or the radical -$CH_2$-$CH_2$-X where X = CN and $COOR_3$, $R_3$ = $C_1$-$C_4$ alkyl.

Examples of suitable compounds of this type (cf. German Offenlegungsschrift No. 1,769,854) are the following:

Examples of suitable compounds of this type (cf. German Offenlegungsschrift No. 1,769,854) are the following:

α-allyl benzoin methyl ether, α-allyl benzoin isopropyl ether, α-allyl benzoin ethyl ether, α-allyl benzoin butyl ether, α-allylbenzoin propyl ether, α-allyl benzoin octyl ether, α-allyl benzoin dodecyl ether, α-benzyl benzoin methyl ether, α-benzyl benzoin ethyl ether, α-benzyl benzoin propyl ether, α-benzyl benzoin isopropyl ether, α-benzyl benzoin butyl ether, α-(2-cyanoethyl) benzoin methyl ether, α-(2-cyanoethyl)-benzoin ethyl ether, α-(2-cyanoethyl)-benzoin propyl ether, α-(2-cyanoethyl)-benzoin isopropyl ether, α-(2-cyanoethyl)-benzoin butyl ether, α-(2-cyanoethyl)-benzoin isobutyl ether, α-(2-cyanoethyl)-benzoin hexyl ether, α-(2-cyanoethyl)-benzoin octyl ether, α-(2-cyanoethyl)-benzoin dodecyl ether, α-(2-cyanoethyl)-benzoin isooctyl ether, α-(2-carboxyethyl)-benzoin methyl ether, α-(2-carboxyethyl)-benzoin ethyl ether, α-(2-carboxyethyl)-benzoin propyl ether, α-(2-carboxyethyl)-benzoin isopropyl ether, α-(2-carboxyethyl)-benzoin butyl ether, α-(2-carboxyethyl)-benzoin isobutyl ether, α-(2-carboxyethyl)-benzoin hexyl ether, α-(2-carboxyethyl)-benzoin octyl ether, α-(2-carboxyethyl)-benzoin dodecyl ether, α-(2-carboxyethyl)-benzoin isooctyl ether, α-(2-carbomethoxyethyl)-benzoin methyl ether, α-(2-carbomethoxyethyl)-benzoin ethyl ether, α-(2-carbomethoxyethyl)-benzoin propyl ether, α-(2-carbomethoxyethyl)-benzoin isopropyl ether, α-(2-carbomethoxyethyl)-benzoin butyl ether, α-(2-carbomethoxyethyl)-benzoin isobutyl ether, α-(2-carbomethoxyethyl)-benzoin hexyl ether, α-(2-carbomethyethyl)-benzoin octyl ether, α-(2-carbomethoxyethyl)-benzoin dodecyl ether, α-(2-carbomethoxyethyl)-benzoin isooctyl ether, α-(2-carboethoxyethyl)-benzoin methyl ether, α-(2-carboethoxyethyl)benzoin ethyl ether, α-(2-carboethoxyethyl)benzoin propyl ether, α-(2-carboethoxyethyl)-benzoin isopropyl ether, α-(2-carboethoxyethyl)-benzoin butyl ether, α-(2-carboethoxyethyl)-benzoin isobutyl ether, α-(2-carboethoxyethyl)-benzoin hexyl ether, α-(2-carboethoxyethyl)-benzoin octyl ether, α-(2-carboethoxyethyl)-benzoin dodecyl ether, α-(2-carboethoxyethyl)-benzoin isooctyl ether, α-(2-carbopropoxy ethyl)-benzoin methyl ether, α-(2-carbopropoxy ethyl)-benzoin ethyl ether, α-(2-carbopropoxyethyl)-benzoin propyl ether, α-(2-carbopropoxyethyl)-benzoin isopropyl ether, α-(2-carbopropoxyethyl)-benzoin butyl ether, α-(2-carbopropoxyethyl)-benzoin isobutyl ether, α-(2-carbopropoxethyl)-benzoin hexyl ether, α-(2-carbopropoxyethyl)-benzoin octyl ether, α-(2-carbopropoxyethyl)-benzoin dodecyl ether, α-(2-carbopropoxyethyl)-benzoin isooctyl ether, α-(2-carbo-n-butoxyethyl) benzoinmethyl ether, α-(2-carbo-n-butoxyethyl)-benzoin ethyl ether, α-(2-carbo-n-butoxyethyl)-benzoin propyl ether, α-(2-carbo-n-butoxyethyl)-benzoin isopropyl ether, α-(2-carbo-n-butoxyethyl)-benzoin butyl ether, α-(2-carbo-n-butoxyethyl)-benzoin isobutyl ether, α-(2-carbo-n-butoxyethyl)-benzoin hexyl ether, α-(2-carbo-n-butoxyethyl)-benzoin octyl ether, α-(2-carbo-n-butoxyethyl)-benzoin dodecyl ether, α-(2-carbo-n-butoxyethyl)-benzoin isooctyl ether, α-(2-carboisooctoxyethyl)-benzoin methyl ether, α-(2-carboisooctoxyethyl)-benzoin ethyl ether, α-(2-carboisooctoxyethyl)-benzoin propyl ether, α-(2-carboisooctoxyethyl)-benzoin isopropyl ether, α-(2-carboisooctoxyethyl)-benzoin butyl ether, α-(2-carboisooctoxyethyl)-benzoin isobutyl ether, α-(2-carboisooctoxyethyl)-benzoin hexyl ether, α-(2-carboisooctoxyethyl)-benzoin octyl ether, α-(2-carboisooctoxyethyl)-benzoin dodecyl ether, α-(2-carboisoocthyl)-benzoin isooctyl ether, α-(2-carbonamidoethyl)-benzoin methyl ether, α-(2-cyanoethyl)-benzoin tetrahydropyranyl ether, α-(2-cyanoethyl)-benzoin-(1-methoxyethylether), α-(2-carbomethoxyethyl)-benzoin tetrahydropyranyl ether, α-(2-carbethoxyethyl)-benzoin-(1-methoxyethylether), α-(2-carbo-n-butoxyethyl)-benzoin tetrahydropyranyl ether and α-(2-carbo-isooctoxyethyl)-benzoin tetrahydropyranyl ether.

By using these special α-substituted benzoin derivatives as photoinitiators, it is surprisingly possible to produce UV-light-hardening mixtures based on polyfunctional acrylic acid esters which, despite their extremely high reactivity under the effect of UV-light, can be stored almost indefinitely in the dark.

Hitherto, it has only been possible to obtain storable, coating compositions with this high reactivity and for the same applications by using a photoinitiator mixture consisting of benzophenone or benzil and Michler's ketone, see for example, German Offenlegungsschrift No.2,345,624. However, an initiator mixture of this kind for hardening under UV-light leads to deep yellow coloured coatings, so that its scope for this particular application is seriously restricted.

In contrast, the α-substituted benzoin derivatives cause hardly any discoloration when used in thin layer thicknesses (2 - 20μ). Accordingly, the UV-light-hardening compositions obtained with them are particularly suitable for coating paper, light woods and plastics.

The above-mentioned photoinitiators, which are used in quantities of from 0.1 to 20% by weight and preferably in quantities of from 0.1 to 5% by weight, based on polymersiable components, according to the purpose for which the compositions according to the invention are to be used, may be used either individually or, on account of frequent advantageous synergistic effects, even in combination with one another.

In many cases, it can be advantageous, whether for improving the film-forming properties of the resin compositions or for obtaining a particularly scratchproof surface of the layers, to use one or more further additives. Thus, the resin compositions may be mixed with other resins, for example with saturated or unsaturated polyester resins.

The resins are preferably used in quantities of from 1 to 50% by weight, based on the polymerisable components. Basically, however, only resins of this type should be used for mixing and the quantity in which they are used limited to such an extent that reactivity is not adversely affected. Suitable lacquer-grade resins of the type commonly used in the lacquer industry are described in E. Karsten's Lackrohstofftabellen, 5th edition, Curt R. Vincentz Verlag, Hanover, 1972, pages 74–106, 195–258, 267–293, 335–347, 357–366.

Advantageous additives which can lead to a further increase in reactivity are certain tertiary amines, for example, triethylamine and triethanolamine.

The above-mentioned substances are preferably used in quantities of from 0 to 5% by weight, based on the polymerisable components.

Radiation sources suitable for carrying out the photopolymerisation reaction include artificial-light sources which emit in the range from 2,500 to 5,000 A and preferably in the range from 3,000 to 4,000 A. It is of advantage to use mercury vapour lamps, xenon and tungsten lamps, more especially high-pressure mercury lamps.

In general, layers of the reaction products according to the invention with a thickness of from 1 μm to 1 mm ( 1 μm = $10^{-3}$ mm) can be hardened into a film in less than 1 second when exposed to the light of a high pressure mercury lamp, for example of the Philips HTQ-7 type, arranged at a distance of approximately 8 cm.

In cases where fillers are used in the applications of the resin compositions according to the invention as UV-light-hardening coatings, their use is restricted to those which do not interfere with polymerisation through their absorption behaviour. For example, it is possible to use talcum, heavy spar, chalk, gypsum, silicas, asbestos powders and light spar as light-permeable fillers.

In cases where hardening is obtained by thermal initiators or by high-energy radiation, for example electron radiation or γ-radiation, it is possible in principle to use any fillers, pigments and reinforcing materials of the type commonly used in lacquer chemistry.

In cases where the resins according to the invention are hardened in the presence of from 0.1 to 10.0% by weight, based on polymerisable components, of thermal polymerisation initiators, the layer thicknesses may amount to between 1μm and 1 mm.

Suitable thermal polymerisation initiators are, for example, diacyl peroxides such as diacetyl peroxide, dibenzoyl peroxide, di-p-chlorobenzoyl peroxide, dilauroyl peroxide, peroxy esters, such as tert-butyl peroxy dicarbonate, alkyl peroxides, such as bis-(tert-butyl peroxy butane), dicumyl peroxide, tert-butyl cumyl peroxide, tert-butyl cumyl peroxide, hydroperoxides such as cumene hydroperoxide, tert-butyl hydroperoxide, ketone peroxides such as cyclohexanone hydroperoxide, methyl ethyl ketone hydroperoxide, acetyl acetone peroxide or azodiisobutyro dinitrile. In many cases, it is often of advantage to add accelerators, such as aromatic amines, cobalt or vanadium salts of organic acids, to the thermal polymerisation initiators.

The coating agents are applied to suitable substrates by the methods normally used in the lacquer industry such as spray coating, roll coating, knife coating, printing, dip coating, flood-coating, spread-coating and brush-coating.

Suitable substrates are paper, cardboards, leather, wood, plastics, textiles, ceramic materials, metals, preferably paper and cardboards. Since the coating compositions harden in time periods of from fractions of a second up to a few seconds to form films with excellent mechanical properties, it is possible for example to adapt a paper coating process to the processing speeds normally encountered in printing.

The viscosities quoted in the Examples were measured in a DIN-4-cup (4 mm nozzle) according to DIN 211 and expressed as the outflow time in seconds.

The philips HTQ-7 lamp used is a high pressure mercury lamp manufactured by the Philips Company.

The pendulum hardnesses are determined with Koenig's pendulum in accordance with DIN 53 157, May 1971 edition.

Bead drying is the determination of the degree of drying in accordance with DIN 53 150, April 1971 edition.

The stamp test is used for determining the surface drying of air-drying lacquer binders. To this end, blue paper is pressed onto the surface by means of a screen. The blue paper imprint on the lacquer surface is a measure of the degree of drying, the assessment scale being as follows: 0 = dry; 1 = almost non-tacky; 2 = dust dry; 3 = tacky; 4 = highly tacky; f = fluid.

The percentage contents quoted in the Examples relate to weight.

EXAMPLE 1

6800 g of bisphenol-A-bis-glycidyl ether (epoxide equivalent 190) were heated to 60° C in a 10 liter three-necked flask equipped with a stirrer, dropping funnel and reflux condenser. 136 g (4.0 mols) of gaseous hydrogen sulphide were then introduced into the reaction liquid over a period of 6 hours at the above-mentioned temperature. 1386 g (19.25 mols) of acrylic acid were then added dropwise over a period of 3 hours at 60° C. The mixture was stirred at 60° C until an acid number of 0 was reached (titration with N/10 NaOH/thymol blue), and was then cooled to room temperature.

Application a. 96 parts by weight of the reaction product of Example 1 were mixed with 4 parts by weight of benzoin isopropyl ether and the resulting mixture was adjusted with butyl acetate to a viscosity corresponding to a flowout time of 20 seconds from a DIN-4-cup. The mixture was then applied to printed paper sheets in a layer thickness of approximately 15μ by means of a hand coater, and hardened under a Philips HTQ-7 -lamp arranged at a distance of 8 cm. The hardened lacquer film was then solvent-resistant and non-tacky. For results of the irradiation time see Table 1.

b. 96 parts by weight of the resin (reaction product of Example 1) were mixed with 4 parts by weight of α-(2-cyanoethyl)-benzoin isopropyl ether and the resulting mixture was again adjusted with butyl acetate to a viscosity corresponding to a flowout time of 20 seconds from a DIN-4-cup. The further procedure as described in a) was then followed, a solvent-resistant tack-free film being obtained. For results of the irradiation time, see Table 1.

d. 70 parts by weight of the reaction product of Example 1 were dissolved in 30 parts by weight of methyl methacrylate, followed by the addition of 2.5 parts by weight of benzoin isopropyl ether, α-(2-cyanoethyl)-benzoin isopropyl ether or benzophenone/1% triethanolamine. The mixture was applied to glass plates in a layer thickness of 500μ by means of a film-drawing unit, and irradiated for 30 seconds under superactinic fluorescent tubes (OSRAM-L-40 watt/70-1, or Philips Thak 40 watt/05), and for 10 and 18 seconds under a high pressure mercury lamp (Philips HTQ-7) arranged at a distance of 10 cm. The pendulum hardnesses (in seconds) according to Albert Koenig were determined after storage in darkness for 1 hours. The results are shown in Table 2.

e. Comparison test with German Offenlegungsschrift No.2,221,335: 96 parts by weight of an unsaturated air-drying polyester resin of 2550 g of fumaric acid, 451 g of 1,2-propylene glycol, 1441 g of diethylene glycol, 941 g of trimetholol propane diallyl ether, 428 g of diethylene glycol monobutyl ether, were mixed with 4 parts by weight of benzoin isopropyl ether and the resulting mixture was adjusted with butyl acetate to a viscosity corresponding to a flowout time of 20 seconds from a DIN-4-cup. The futher procedure as described in a) was then employed. A film was produced on printed sheets of paper. Hardening to form a solvent-resistant tack-free film required a much longer irradiation time cf. Table 3.

f. Comparison test with US-PS 3,485,733: A comparison test with US-PS 3,485,733 is intended to show that the high reactivity surprisingly found is not attributable to molecular enlargement. 680 g of bisphenol-A-bis-glycidyl ether(epoxy equivalent 190) were heated to 60° C in a 2 liter three-necked flask equipped with a stirrer, reflux condenser and dropping funnel. Following the addition of 7 g of thiodiglycol, 177 g of adipic acid were added in portions and the mixture stirred until the acid number had fallen below the value 10. 142 g of acrylic acid were then added, the mixture was stirred until an acid number of 0 had been reached and subsequently cooled to room temperature.

Application

A. 96 parts by weight of the reaction product produced in accordance with 1 f) were mixed with 4 parts by weight of benzoin isopropyl ether and the resulting mixture was adjusted with butyl acetate to a viscosity corresponding to a flowout time of 20 seconds from a DIN-A-4-cup. The further procedure as in 1a) was then followed. For results see Table 4.

B. 30 parts of methyl methacrylate were added to 70 parts by weight of the reaction product of Comparison Example 1 f). The further procedure as described in 1a) was then followed. Photoinitiators added, the quantities in which they are added and the pendulum hardness values according to DIN 53 157 are set out in Table 2.

Table 1

Air-drying poxyide resin according to Examples 1a to 1c

| Example | 4% of photoinitiator | Irradiation time [seconds] |
|---|---|---|
| 1a | benzoin isopropyl ether | 0.9 |
| 1b | α-(2-cyanoethyl)-benzoin isopropyl ether | 1.0 |
| 1c | benzophenone + 1% by weight of triethanolamine | 1.2 |

Table 2

Pendulum hardnesses according to Albert Koenig (DIN 53 157) (in seconds) after irradiation for 18 seconds under a Philips HTQ-7 lamp

| 2.5% of photoinitiator | Example 1d | Comparison Example 1 f(B) |
|---|---|---|
| benzoin isopropyl ether | 172 | 109 |
| α-(2-cyanoethyl)-benzoin isopropyl ether | 175 | 125 |
| Benzophenone + 1% of triethanolamine | 168 | 80 |

Table 3

Air-drying polyester resin according to DT-OS 2,221,335

| 4% of photoinitiator | Irradiation time [seconds] |
|---|---|
| benzoin isopropyl ether | 5 |

Table 4

Epoxide resin according to Comparison Test 1 f(A)

| 4% of photoinitiator | Irradiation time [seconds] |
|---|---|
| benzoin isopropyl ether | 8 |

Example 2 a. 70 parts by weight of the reaction product of Example 1 were mixed with 30 parts by weight of methyl methacrylate, followed by the addition of 2% of benzoyl peroxide(100%) and 1% of diethyl aniline. 500 μ thick films were then drawn onto glass plates by means of a film-drawing unit, and the times required for bead drying and to obtain stage "0" of the stamp test were measured.

b. Comparison with US-PS 3,485,733 70 parts by weight of the reaction product of comparison test 1 f) were mixed with 30 parts by weight of methyl methacrylate. The further procedure was as in Example 2a). For results see Table 5.

Table 5

Drying times with conventional hardening

|  | Bead drying (mins.) | Stamp test (hours) |
| --- | --- | --- |
| resin mixture according to Example 2a | 10 | 1 |
| comparison resin mixture according to Example 2b | —*) | —*) |

*) after 24 hours impossible to determine

EXAMPLE 3

680 parts by weight of bisphenol-A-bis-glycidyl ether (epoxide equivalent 190) were heated to 60° C in a three-necked flask equipped with a stirrer, dropping funnel and reflux condenser. 13.6 parts by weight of gaseous hydrogen sulphide were then introduced into the solution over a period of 4 hours.

160 parts by weight of acrylic acid were then added dropwise over a period of 3 hours, again at a temperature of 60° C. The reaction mixture was cooled to room temperature when an acid number of 0 was reached.

96 parts by weight of the resin were mixed with 4 parts by weight of α-(β-carbomethoxy)-ethyl benzoin isopropyl ether, and the resulting mixture was adjusted with butyl acetate to a viscosity corresponding to a flowout time of 20 seconds from a DIN-4-cup at a temperature of 20° C. The mixture was then applied to sheets of printed paper in a layer thickness of 15 μ by means of a hand coater, and hardened under a Philips HTQ 4 lamp arranged at a distance of 8 cm. The irradiation time required for complete hardening was 1 second.

After storage for 4 weeks at 60° C, the mixture had not undergone any changes, whereas a corresponding mixture containing 4% by weight of benzoin isopropyl ether gelled after only 18 hours.

EXAMPLE 4

Approximately 4 mols (107 g) of adipic acid-bis-(2-mercapto)-diethyl ester were added dropwise over a period of 1 hours at 60° C to 680 g of bisphenol-A-bis-glycidyl ether (epoxide equivalent 190) in a 1 liter three-necked flask equipped with a dropping funnel, stirrer and thermometer. After stirring for 2 hours, 160 g of acrylic acid were added dropwise over a period of 2 hours at 60° C. After an acid number of 0 had been reached, the mixture was stabilised with 0.02% by weight of hydroquinone mono methyl ether and cooled to 20° C.

APPLICATION 4 parts by weight of benzoin isopropyl ether, α-(2-cyanoethyl)-benzoin isopropyl ether and of benzophenone mixed with 1 % by weight of triethanolamine were added to separate batches of 96 parts by weight of the reaction product according to Example 4, followed by dilution with butyl acetate to a viscosity corresponding to a flowout time of 20 seconds from a DIN-4-cup. The mixture was then applied to sheets of printed paper in a layer thickness of approximately 15 μ by means of a hand coater and irradiated under a Philips HTQ 7 lamp arranged at a distance of 8 cm until a solvent-resistant and tack-free film was obtained. Table 6 shows the irradiation times.

Table 6

Air-drying epoxide resin according to Example 4

| 4% of photoinitiator | Irradiation time [seconds] |
| --- | --- |
| benzoin isopropyl ether | 0.9 |
| α-(2-cyanoethyl)-benzoin isopropylether | 1.0 |
| benzophenone + triethanolamine | 1.2 |

EXAMPLE 5

560 g of hexahydrophthalic acid diglycidyl ester (epoxy equivalent 172) were heated to 60° C in a 2 liter three-necked flask equipped with a stirrer, dropping funnel and reflux condenser. 20.4 g (0.6 mol) of hydrogen sulphide were then introduced over a period of 2 hours at the same temperature. After stirring for 2 hours, 160 g (2.2 mols) of acrylic acid were added dropwise over a period of 3 hours at 60° C. The reaction mixture was then stirred at this temperature until an acid number of 0 was reached (titration with N/10 NaOH/thymol blue), followed by cooling to room temperature.

APPLICATION 4 parts by weight of α-(β-methoxycarbonyl)-ethyl benzoin isopropyl ether, 4 parts by weight of α-(2-cyanoethyl)benzoin isopropyl ether and 4 parts by weight of benzophenone/1% by weight of triethanolamine, were added to separate batches of 96 parts by weight of the reaction product of Example 5, followed by diltuion with butyl acetate to a viscosity corresponding to a flowout time of 20 seconds from a DIN-4-cup. The mixture was then applied to sheets of printed paper in a layer thickness of approximately 15 μ by means of a hand coater and irradiated under a Philips PTQ 7 lamp arranged at a distance of 8 cm until a solvent (cyclohexanone)-resistant and tack-free film was obtained. Table 7 shows the irradiation times.

TABLE 7

Air-drying epoxide resin according to Example 6

| 4% of photoinitiator | Irradiation time [seconds] |
| --- | --- |
| α-(β-methoxycarbonyl)-ethyl benzoin isopropyl ether | 1.1 |
| α-(2-cyanoethyl)-benzoin isopropyl ether | 1.0 |
| benzophenone + 1% by weight of triethanolamine | 1.2 |

We claim:
1. A process for the production of a reaction product of a polyepoxide and an α,β-monoolefinically unsaturated carboxylic acid, wherein at least 60% of the epoxide groups of a polyepoxide with more than one 1,2-epoxide group per molecule are reacted
   a. with 0.01 to 0.6 SH-equivalents, ased on one epoxide equivalent, of hydrogen sulphide, an aliphatic cycloaliphatic aromatic or araliphatic dithiol or polythiol or with a mixture thereof, and subsequently b. with 0.99 to 0.4 carboxyl equivalents, based on one epoxide equivalent, of acrylic or methacrylic acid or of a mixture thereof.

2. An air-drying coating composition comprising a reaction product of a polyepoxide with more than one 1,2-epoxide group per molecule, at least 60% of whose epoxide groups have been reacted a. with 0.01 to 0.6 SH-equivalents, based on one epoxide equivalent, of hydrogen sulphide, an aliphatic or cycloaliphatic, aromatic or araliphatic dithiol or polythiol or with a mixture thereof, and subsequently b. with 0.99 to 0.4 carboxyl equivalents, based on one epoxide equivalent, of acrylic or methacrylic acid or of a mixture thereof.

* * * * *